United States Patent
Hudson et al.

(10) Patent No.: US 10,260,394 B2
(45) Date of Patent: Apr. 16, 2019

(54) AUTOMATIC PERFORMANCE TUNING FOR DIESEL EXHAUST FLUID DOSING UNIT

(71) Applicant: Cummins Emission Solutions, Inc., Columbus, IN (US)

(72) Inventors: Patrick C. Hudson, Indianapolis, IN (US); Nassim Khaled, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 15/570,089

(22) PCT Filed: May 1, 2015

(86) PCT No.: PCT/US2015/028775
§ 371 (c)(1),
(2) Date: Oct. 27, 2017

(87) PCT Pub. No.: WO2016/178648
PCT Pub. Date: Nov. 10, 2016

(65) Prior Publication Data
US 2018/0149058 A1 May 31, 2018

(51) Int. Cl.
*F01N 3/20* (2006.01)
*F01N 9/00* (2006.01)
*F01N 3/10* (2006.01)

(52) U.S. Cl.
CPC .............. *F01N 3/208* (2013.01); *F01N 9/00* (2013.01); *F01N 2610/1406* (2013.01);
(Continued)

(58) Field of Classification Search
CPC .... F01N 3/208; F01N 9/00; F01N 2900/1808; F01N 2900/1812; F01N 2900/1814;
(Continued)

(56) References Cited

U.S. PATENT DOCUMENTS

| | | |
|---|---|---|
| 5,295,157 A | 3/1994 | Suzuki et al. |
| 5,307,276 A | 4/1994 | Takahashi et al. |

(Continued)

OTHER PUBLICATIONS

First Office Action issued for U.S. Appl. No. 15/046,896, dated Sep. 25, 2017, 31 pages.

(Continued)

*Primary Examiner* — Audrey K Bradley
*Assistant Examiner* — Dapinder Singh
(74) *Attorney, Agent, or Firm* — Foley & Lardner LLP

(57) ABSTRACT

An auto-calibration controller configured to automatically tune a dosing unit of an aftertreatment system. The auto-calibration controller is configured to command the dosing unit to dose reductant at a first dosing command rate at a first input pressure value based on a dosing command value of a dosing command table. The auto-calibration controller is further configured to interpret a parameter indicative of an actual amount of dosed reductant by the dosing unit and compare the actual amount of dosed reductant to an expected amount of dosed reductant. The auto-calibration controller is further configured to update the dosing command value of the dosing command table of a control module of the aftertreatment system responsive to the comparison of the actual amount of dosed reductant to the expected amount of dosed reductant.

26 Claims, 4 Drawing Sheets

(52) U.S. Cl.
CPC ..... *F01N 2610/148* (2013.01); *F01N 2900/1808* (2013.01); *F01N 2900/1812* (2013.01); *F01N 2900/1814* (2013.01); *Y02T 10/24* (2013.01); *Y02T 10/47* (2013.01)

(58) Field of Classification Search
CPC ....... F01N 2610/1406; F01N 2610/148; Y02T 10/24; Y02T 10/47
USPC ............... 60/274, 277, 286, 295, 299–301
See application file for complete search history.

(56) References Cited

U.S. PATENT DOCUMENTS

| | | | |
|---|---|---|---|
| 5,329,803 | A | 7/1994 | Booth |
| 5,487,007 | A | 1/1996 | Suzuki et al. |
| 5,508,919 | A | 4/1996 | Suzuki et al. |
| 5,758,025 | A | 5/1998 | Wu |
| 5,769,314 | A | 6/1998 | Drees et al. |
| 5,832,896 | A | 11/1998 | Phipps |
| 5,988,848 | A | 11/1999 | Berstecher et al. |
| 6,185,300 | B1 | 2/2001 | Romesburg |
| 6,405,122 | B1 | 6/2002 | Yamaguchi |
| 8,156,729 | B2 | 4/2012 | Sun |
| 8,326,505 | B2 | 12/2012 | Cesario et al. |
| 8,834,820 | B1 | 9/2014 | Mowers et al. |
| 9,617,885 | B2 | 4/2017 | Dyrbusch et al. |
| 2003/0067355 | A1 | 4/2003 | Wojsznis et al. |
| 2006/0178836 | A1 | 8/2006 | Bai et al. |
| 2007/0049188 | A1 | 3/2007 | McCoy |
| 2009/0070022 | A1 | 3/2009 | Dudek |
| 2010/0010215 | A1 | 1/2010 | Isaacs et al. |
| 2010/0101215 | A1 | 4/2010 | Wu et al. |
| 2010/0212417 | A1 | 8/2010 | Crawford et al. |
| 2011/0283699 | A1 | 11/2011 | Surnilla et al. |
| 2012/0000189 | A1 | 1/2012 | Wang et al. |
| 2013/0064716 | A1* | 3/2013 | Fukuoka ................. F01N 3/208 422/106 |
| 2013/0152545 | A1 | 6/2013 | Chavannavar |
| 2013/0283771 | A1* | 10/2013 | Nagata .................. F01N 3/2066 60/282 |
| 2014/0053535 | A1 | 2/2014 | Dyrbusch et al. |
| 2014/0053537 | A1 | 2/2014 | Yan et al. |
| 2014/0074382 | A1 | 3/2014 | Methil-Sudhakaran et al. |
| 2014/0099248 | A1* | 4/2014 | Broderick ............ B01D 53/565 423/239.1 |
| 2014/0165539 | A1* | 6/2014 | Nagata .................... F01N 3/208 60/286 |
| 2014/0325965 | A1* | 11/2014 | Tuken .................... F01N 3/208 60/286 |
| 2015/0066337 | A1 | 3/2015 | Langley et al. |
| 2015/0104363 | A1 | 4/2015 | Singh et al. |
| 2015/0218990 | A1 | 8/2015 | Hudgens |
| 2016/0010529 | A1 | 1/2016 | Wang et al. |
| 2016/0017781 | A1* | 1/2016 | Nihongi ................ G01F 23/64 73/61.43 |

OTHER PUBLICATIONS

The International Search Report and Written Opinion issued in PCT/US2015/028775, dated Aug. 5, 2015.

* cited by examiner

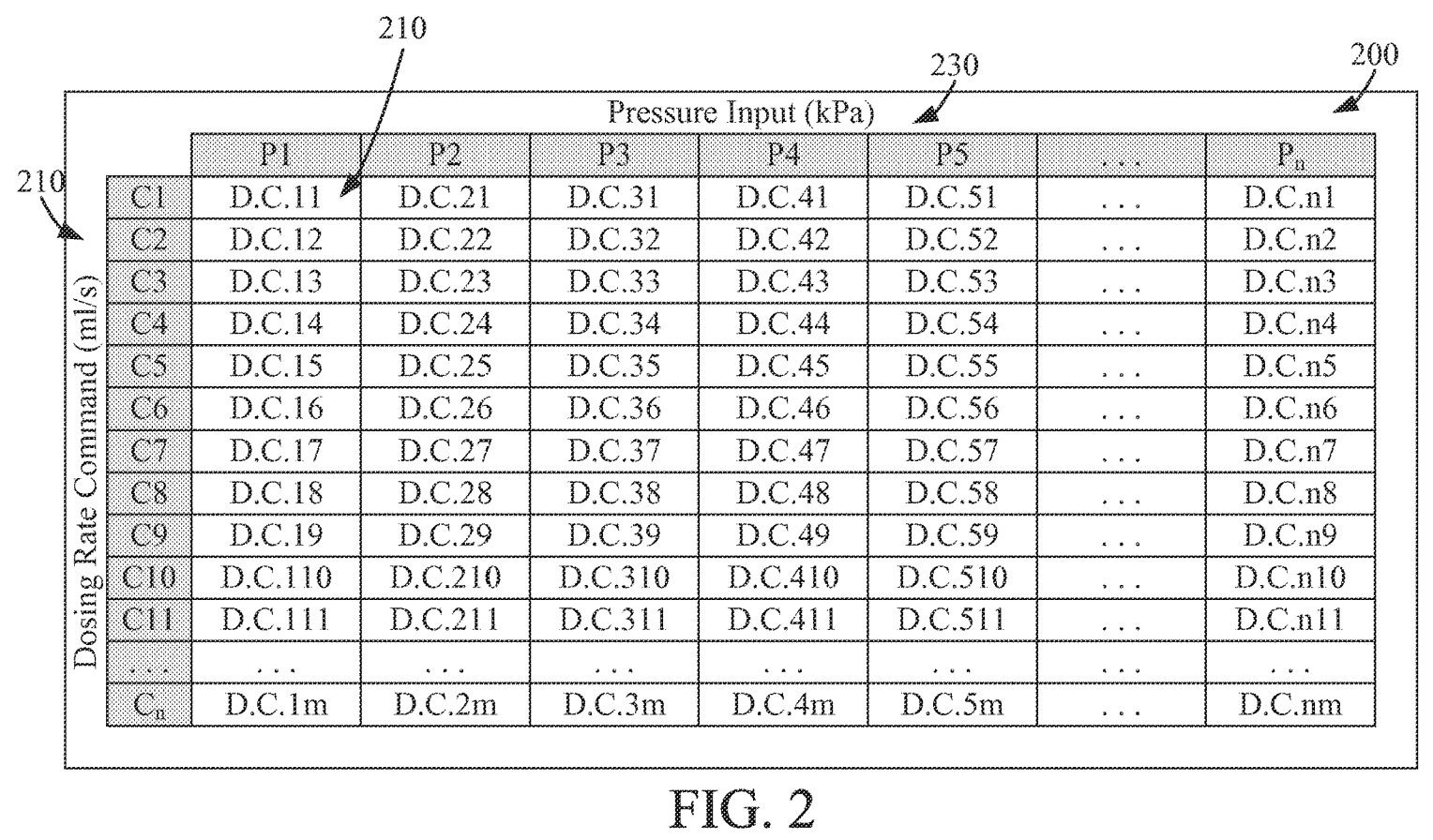

| | Pressure Input (kPa) | | | | | | |
|---|---|---|---|---|---|---|---|
| | P1 | P2 | P3 | P4 | P5 | ... | Pn |
| C1 | D.C.11 | D.C.21 | D.C.31 | D.C.41 | D.C.51 | ... | D.C.n1 |
| C2 | D.C.12 | D.C.22 | D.C.32 | D.C.42 | D.C.52 | ... | D.C.n2 |
| C3 | D.C.13 | D.C.23 | D.C.33 | D.C.43 | D.C.53 | ... | D.C.n3 |
| C4 | D.C.14 | D.C.24 | D.C.34 | D.C.44 | D.C.54 | ... | D.C.n4 |
| C5 | D.C.15 | D.C.25 | D.C.35 | D.C.45 | D.C.55 | ... | D.C.n5 |
| C6 | D.C.16 | D.C.26 | D.C.36 | D.C.46 | D.C.56 | ... | D.C.n6 |
| C7 | D.C.17 | D.C.27 | D.C.37 | D.C.47 | D.C.57 | ... | D.C.n7 |
| C8 | D.C.18 | D.C.28 | D.C.38 | D.C.48 | D.C.58 | ... | D.C.n8 |
| C9 | D.C.19 | D.C.29 | D.C.39 | D.C.49 | D.C.59 | ... | D.C.n9 |
| C10 | D.C.110 | D.C.210 | D.C.310 | D.C.410 | D.C.510 | ... | D.C.n10 |
| C11 | D.C.111 | D.C.211 | D.C.311 | D.C.411 | D.C.511 | ... | D.C.n11 |
| ... | ... | ... | ... | ... | ... | ... | ... |
| Cn | D.C.1m | D.C.2m | D.C.3m | D.C.4m | D.C.5m | ... | D.C.nm |

Dosing Rate Command (ml/s)

FIG. 2

AUTOMATIC PERFORMANCE TUNING FOR DIESEL EXHAUST FLUID DOSING UNIT

CROSS-REFERECNCE TO RELATED APPLICATION

The present application is a National Stage of PCT Application No. PCT/US2015/028775, filed May 1, 2015, the contents of which are incorporated herein by reference in its entirety.

TECHNICAL FIELD

The present application relates generally to the field of aftertreatment systems for internal combustion engines.

BACKGROUND

For internal combustion engines such as diesel engines, nitrogen oxide ($NO_x$) compounds may be emitted in the exhaust. To reduce $NO_x$ emissions, a selective catalytic reduction (SCR) process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia, aqueous ammonia, or urea is typically introduced into the exhaust gas flow prior to the catalyst chamber. To introduce the reductant into the exhaust gas flow for the SCR process, an SCR system may dose or otherwise introduce the reductant through a dosing unit that vaporizes or sprays the reductant into an exhaust pipe of the exhaust system upstream of the catalyst chamber. The SCR system may include one or more sensors to monitor conditions within the exhaust system.

SUMMARY

Implementations described herein relate to automatically tuning dosing commands for a dosing unit. An engine control module and/or dosing control module may include one or more dosing tables that include dosing commands for look-up based on a commanded dosing rate and a pressure at which the reductant is delivered to the dosing unit. The automatic tuning of the dosing command for the dosing unit may confirm and/or modify the dosing commands of the dosing command table by measuring the amount of dosed reductant when a particular command is sent from the engine control module, determining whether the actual dosed amount is the same or substantially the same as the expected dosed amount, and modifying one or more parameters to update the dosing command of the dosing command table if the actual dosed amount is not the same or substantially the same as the expected dosed amount.

One implementation relates to a system that includes an aftertreatment system, a pressure sensor, a second sensor, and an auto-calibration controller. The aftertreatment system includes a dosing unit, a reductant tank in fluid communication with the dosing unit, and a control module. The control module is operable to control dosing of reductant from the dosing unit based on a dosing command table. The pressure sensor is configured to detect an input pressure of reductant to the dosing unit from the reductant tank. The second sensor is configured to measure an actual amount of dosed reductant by the dosing unit. The auto-calibration controller is configured to interpret a first parameter indicative of the input pressure of reductant to the dosing unit as substantially equal to a first input pressure value. The auto-calibration controller is also configured to command the control module of the aftertreatment system to command the dosing unit to dose reductant at a first dosing command rate at the first input pressure value based on a dosing command value of the dosing command table. The auto-calibration controller is further configured to interpret a second parameter indicative of the actual amount of dosed reductant by the dosing unit and compare the interpreted second parameter indicative of the actual amount of dosed reductant to an expected amount of dosed reductant based on the first dosing command rate. The auto-calibration controller is still further configured to update the dosing command value of the dosing command table of the control module of the aftertreatment system responsive to the comparison of the interpreted second parameter indicative of the actual amount of dosed reductant to the expected amount of dosed reductant.

Another implementation relates to an auto-calibration controller for automatically tuning a dosing module of an aftertreatment system. The aftertreatment system includes the dosing module, a reductant tank in fluid communication with the dosing unit, and a control module. The control module is operable to control dosing of reductant from the dosing unit based on a dosing command table. The auto-calibration controller includes a calibration module configured to interpret a first parameter indicative of an input pressure of reductant to the dosing unit as substantially equal to an input pressure value of the dosing command table. The calibration module is also configured to command the dosing unit to dose reductant at a dosing command rate at the input pressure value based on a dosing command value of the dosing command table. The calibration module is further configured to interpret a second parameter indicative of the actual amount of dosed reductant by the dosing unit and compare the interpreted second parameter indicative of the actual amount of dosed reductant to an expected amount of dosed reductant based on the dosing command rate. The calibration module is still further configured to update the dosing command value of the dosing command table of the control module of the aftertreatment system responsive to the comparison of the interpreted second parameter indicative of the actual amount of dosed reductant to the expected amount of dosed reductant.

Yet a further implementation relates to a system that includes an aftertreatment system and an auto-calibration controller. The aftertreatment system a dosing unit, a reductant tank in fluid communication with the dosing unit, and a control module. The control module is operable to control dosing of reductant from the dosing unit based on a dosing command table. The auto-calibration controller is configured to interpret a first parameter indicative of an input pressure of reductant to the dosing unit as substantially equal to an input pressure value. The auto-calibration controller is also configured to command the dosing unit to dose reductant at a dosing command rate at the input pressure value based on a dosing command value of the dosing command table. The auto-calibration controller is further configured to interpret a second parameter indicative of an actual amount of dosed reductant by the dosing unit and compare the interpreted second parameter indicative of the actual amount of dosed reductant to an expected amount of dosed reductant based on the dosing command rate. The auto-calibration controller is still further configured to update the dosing command value of the dosing command table of the control module of the aftertreatment system responsive to the comparison of the interpreted second parameter indicative of the actual amount of dosed reductant to the expected amount of dosed reductant.

Still a further implementation relates to an aftertreatment system that includes a dosing unit, a reductant tank in fluid communication with the dosing unit, and a control module. The control module is operable to control dosing of reductant from the dosing unit based on a dosing command table. The control module also includes an auto-calibration control module that is configured to interpret a first parameter indicative of an input pressure of reductant to the dosing unit as substantially equal to an input pressure value. The auto-calibration control module is also configured to command the dosing unit to dose reductant at a dosing command rate at the input pressure value based on a dosing command value of the dosing command table. The auto-calibration control module is further configured to interpret a second parameter indicative of an actual amount of dosed reductant by the dosing unit and compare the interpreted second parameter indicative of the actual amount of dosed reductant to an expected amount of dosed reductant based on the dosing command rate. The auto-calibration control module is still further configured to update the dosing command value of the dosing command table of the control module of the aftertreatment system responsive to the comparison of the interpreted second parameter indicative of the actual amount of dosed reductant to the expected amount of dosed reductant.

Still a further implementation relates to a method for automatic performance tuning of a dosing unit using an automatic calibration controller. The method includes interpreting a first parameter indicative of an input pressure of reductant to the dosing unit from a pressure sensor as substantially equal to an input pressure value. The method also includes commanding the dosing unit to dose reductant at a dosing command rate at the input pressure value based on a dosing command value of a dosing command table stored in a computer readable storage medium of a control module operable to control dosing of reductant from the dosing unit based on the dosing command table. The method further includes interpreting a second parameter indicative of an actual amount of dosed reductant by the dosing unit from a second sensor and comparing the interpreted second parameter indicative of the actual amount of dosed reductant to an expected amount of dosed reductant based on the dosing command rate. The method still further includes updating the dosing command value of the dosing command table of the control module of an aftertreatment system to an updated dosing command value responsive to the comparison of the interpreted second parameter indicative of the actual amount of dosed reductant to the expected amount of dosed reductant.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

FIG. 2 is an overview of an example dosing command table having several dosing commands based on a corresponding pressure and a commanded dosing rate;

Figure 1:
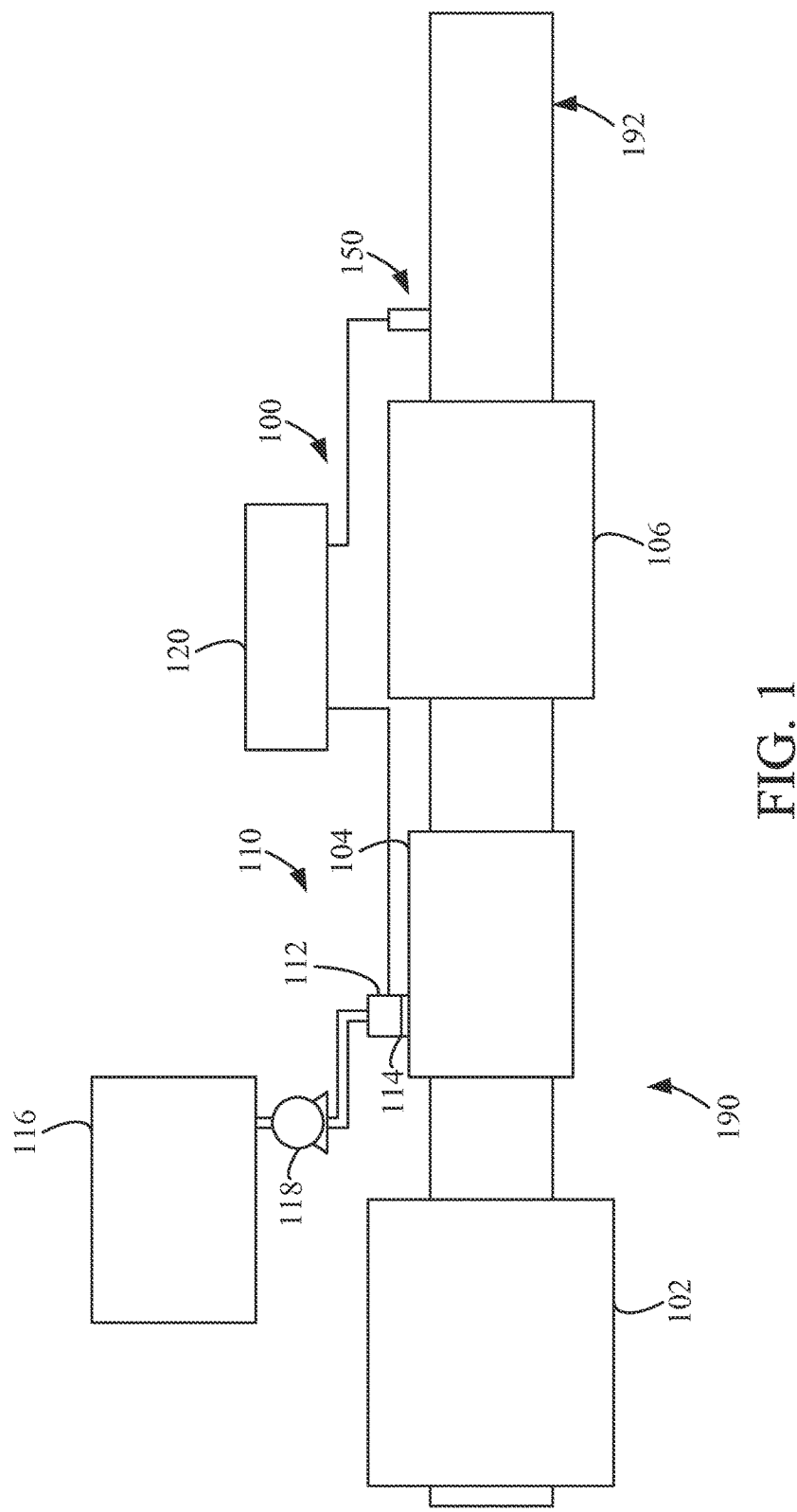
FIG. 1 is a block schematic diagram of an example selective catalytic reduction system having an example reductant delivery system for an exhaust system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for automatically tuning dosing commands for a dosing unit. The various concepts introduced above and discussed in greater detail below may be implemented in any of numerous ways, as the described concepts are not limited to any particular manner of implementation. Examples of specific implementations and applications are provided primarily for illustrative purposes.

I. Overview

For vehicles with an aftertreatment system, whether a dosing unit is properly tuned to the system may affect how the system performs overall. For instance, if the dosing unit under-doses reductant to exhaust gas flowing through the exhaust system, excess $NO_x$ emissions may be emitted. Similarly, if the dosing unit over-doses reductant to exhaust gas flowing through the exhaust system, excess ammonia may be emitted (referred to as ammonia slip). Thus, performance tuning of a dosing unit can directly affect the overall performance of an aftertreatment system.

In some instances, a manufacturer of a dosing unit may use a tuning process once the dosing unit is manufactured. However, such tuning may be independent of the final system into which the dosing unit is to be integrated. This can have various effects on the dosing unit (e.g., different pumps may operate at different speeds and/or pressures, the reductant fluid tubes or conduits may affect the flow of reductant, etc.). Thus, the manufacturing tuning process may not be a sufficient tuning process as it does not test or tune the dosing unit in conditions reflecting an end party usage. More importantly such a tuning process is typically a mechanical process of aligning manufactured parts to a specification.

Thus, various embodiments discussed herein involve tuning the performance of the dosing unit based on a final system into which the dosing unit will be integrated. That is, dosing units having default configurations from a manufacturer are tuned for use inside final aftertreatment systems to be controlled with differing control modules. Because manufacturers of dosing units typically do not tune the dosing unit based on the final aftertreatment system of an end party, the control module controlling the dosing unit may not be tuned to capture and define all the physics-based variations that may occur in the final aftertreatment system, thereby rendering the dosing unit less effective in some operating conditions.

Moreover, such tuning processes may involve automatically configuring the dosing unit, thereby reducing the time needed for an engineer or other operator to adjust the settings of the dosing unit. A typical dosing unit tuning process may require hundreds of tuning hours per application, which increases costs and consumes man-hours that could be put to other uses. Moreover, the tuning would need to be re-conducted for any change in the system architecture which would impact the dosing unit; including, but not limited to, hardware changes, software changes, or changes in dosing unit usage.

II. Overview of Aftertreatment System

FIG. 1 depicts an aftertreatment system 100 having an example reductant delivery system 110 for an exhaust system 190. The aftertreatment system 100 includes a diesel particulate filter (DPF) 102, the reductant delivery system 110, a decomposition chamber or reactor 104, a SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea or diesel exhaust fluid (DEF), into ammonia. The decomposition chamber 104 includes a reductant delivery system 110 having a dosing unit 112 configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the dosing unit 112 mounted to the decomposition chamber 104 such that the dosing unit 112 may dose the reductant into the exhaust gases flowing in the exhaust system 190. The dosing unit 112 may include an insulator 114 interposed between a portion of the dosing unit 112 and the portion of the decomposition chamber 104 to which the dosing unit 112 is mounted. The dosing unit 112 is fluidly coupled to one or more reductant sources 116. In some implementations, a pump 118 may be used to pressurize the reductant from the reductant source 116 for delivery to the dosing unit 112.

The dosing unit 112 and pump 118 are also electrically or communicatively coupled to a controller 120. The controller 120 is configured to control the dosing unit 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

Figure 4:
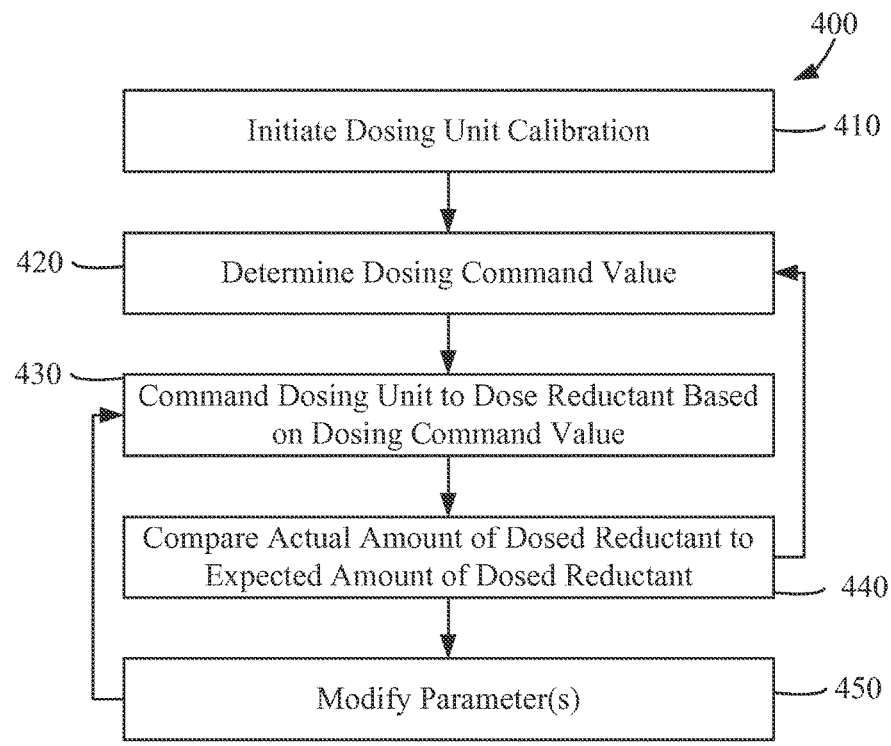
FIG. 4 is a process diagram depicting an example process for automatically tuning dosing commands for a dosing unit.
Figure 5:
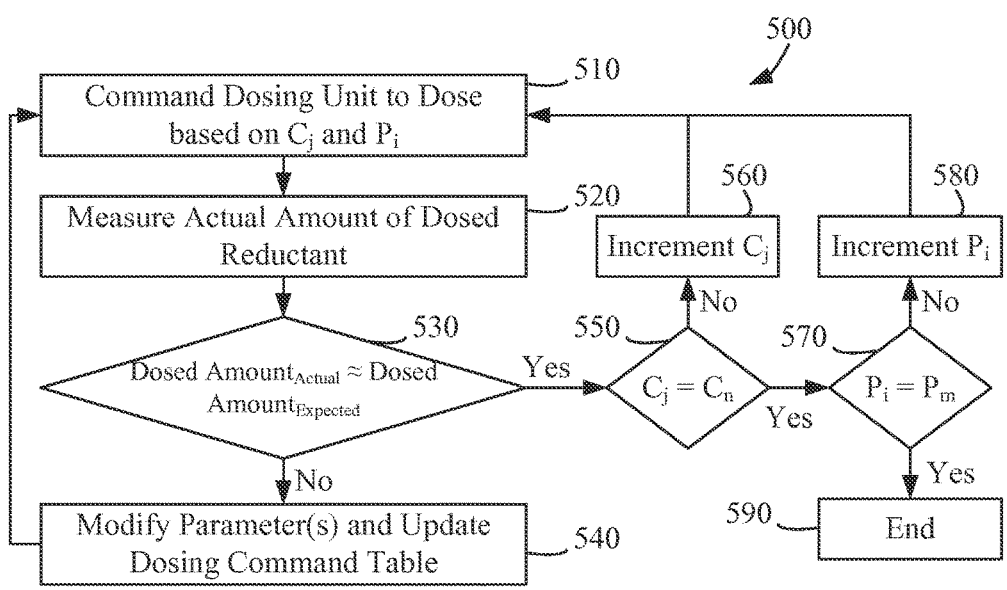
FIG. 5 is a process diagram of an example algorithm for implementing the process of FIG. 4.

In certain implementations, the controller 120 is structured to perform certain operations, such as those described herein in relation to FIGS. 4-5. In certain implementations, the controller 120 forms a portion of a processing subsystem including one or more computing devices having memory, processing, and communication hardware. The controller 120 may be a single device or a distributed device, and the functions of the controller 120 may be performed by hardware and/or as computer instructions on a non-transient computer readable storage medium.

In certain implementations, the controller 120 includes one or more modules structured to functionally execute the operations of the controller 120. In certain implementations, the controller 120 may include an auto-calibration controller or control module for performing the operations described in reference to FIGS. 4-5. The description herein including modules emphasizes the structural independence of the aspects of the controller 120 and illustrates one grouping of operations and responsibilities of the controller 120. Other groupings that execute similar overall operations are understood within the scope of the present application. Modules may be implemented in hardware and/or as computer instructions on a non-transient computer readable storage medium, and modules may be distributed across various hardware or computer based components. More specific descriptions of certain embodiments of controller operations are included in the section referencing FIGS. 4-5.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system 190.

The exhaust system 190 may further include a diesel oxidation catalyst (DOC) in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber or reactor pipe 104. For instance, the DPF 102 and the SCR catalyst 106 may be combined into a single unit (referred to herein as an SDPF). In some implementations, the dosing unit 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190, such as a tip of the sensor 150 may extend into a portion of the exhaust system 190. In other implementations, the sensor 150 may receive exhaust gas through another conduit, such as a sample pipe extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensor 150 may be utilized for detecting a condition of the exhaust gas, such as two, three, four, five, or size sensor 150 with each sensor 150 located at one of the foregoing positions of the exhaust system 190.

III. Example Automatic Performance Tuning for a Dosing Unit

A dosing unit, such as dosing unit 112 of FIG. 1, may be controlled by a controller, such as controller 120. To control the actual amount of dosed reductant, the controller may use a dosing command table having several stored dosing command values. The dosing command values may be one or more parameters having values for controlling one or more aspects of the dosing unit and/or other components that affect how reductant is dosed from the dosing unit. For instance, an actuator of the dosing unit may be opened and/or closed by varying amounts to selectively control the amount of dosed reductant by the dosing unit. In addition, various valve components may be opened and/or closed to control an amount of reductant cycled through a dosing unit back to a reductant tank. Pressure supply valves may be opened and/or closed to vary an amount of pressure supplied to the dosing unit and/or other portions of a dosing system, such as to pressurize a reductant tank. Still other aspects of the dosing unit and/or other components of a dosing system may be controlled when dosing reductant. Thus, although a final commanded amount of reductant is to be dosed to the aftertreatment system, several components may affect the dosing of reductant.

In some implementations, the dosing command table may have several stored dosing command values based on a commanded amount of reductant to be dosed into the aftertreatment system, such as a dosing rate command, and a pressure input value. That is, for a given dosing rate command (e.g., in milliliters of reductant per second) and a given pressure input value, such as the pressure of reductant being delivered to the dosing unit, the dosing command table may store a dosing command value and/or set of values to control the operation of the dosing unit and/or the other components of the dosing system. FIG. 2 depicts an example dosing command table 200 having several dosing command values 210 for various dosing rate commands 220 and pressure input values 230.

The dosing rate commands 220 can be a predetermined set of dosing rate commands. In some implementations, the predetermined set of dosing rate commands may be set based on a zero-dosing rate (i.e., 0 mL/s) to a maximum dosing rate for the dosing unit. The set of dosing rate commands may be a range, such as 0 mL/s to 100 mL/s in 0.1 mL/s increments. The predetermined set of dosing rate commands may be set by a manufacturer of the dosing unit and/or may be modified based on the final aftertreatment system of the end user.

The pressure input values 230 can be a predetermined set of pressure input values. In some implementations, the predetermined set of pressure input values may be set based on a zero pressure input (i.e., 0 kPa) to a maximum pressure input for the dosing unit. The set of pressure input values may be a range, such as 0 kPa to 100 kPa in 0.1 kPa increments. The predetermined set of pressure input values may be set by a manufacturer of the dosing unit and/or may be modified based on the final aftertreatment system of the end user.

The amount of reductant actually dosed from dosing unit and/or the actual dosing rate can vary based on the pressure of the reductant being supplied to the dosing unit, the amount that a dosing nozzle of the dosing unit is open, an amount of reductant being cycled back to a reductant tank, etc. The dosing command table 200 can be populated with dosing command values 210 based on a commanded amount of dosed reductant from dosing unit and/or a commanded dosing rate and a pressure input value for the pressure of reductant supplied to the dosing unit. The dosing command table 200 may initially be pre-populated with dosing command values by a manufacturer without regard to the final system into which the dosing unit will be integrated. However, such dosing command values may result in an amount of reductant to be dosed that differs from the commanded amount of reductant to be dosed, such as due to varying reductant pumps used, varying piping or conduit diameters or lengths, etc. As a result, the actual amount of dosed reductant may differ from the commanded amount of reductant to be dosed. Accordingly, it may be useful to tune the dosing unit via modifying and/or updating the dosing command values 210 of the dosing command table. Such performance tuning can substantially conform the actual amount dosed from the dosing unit to the commanded amount dosed from the dosing unit for the final system into which the dosing unit is integrated.

Figure 3:
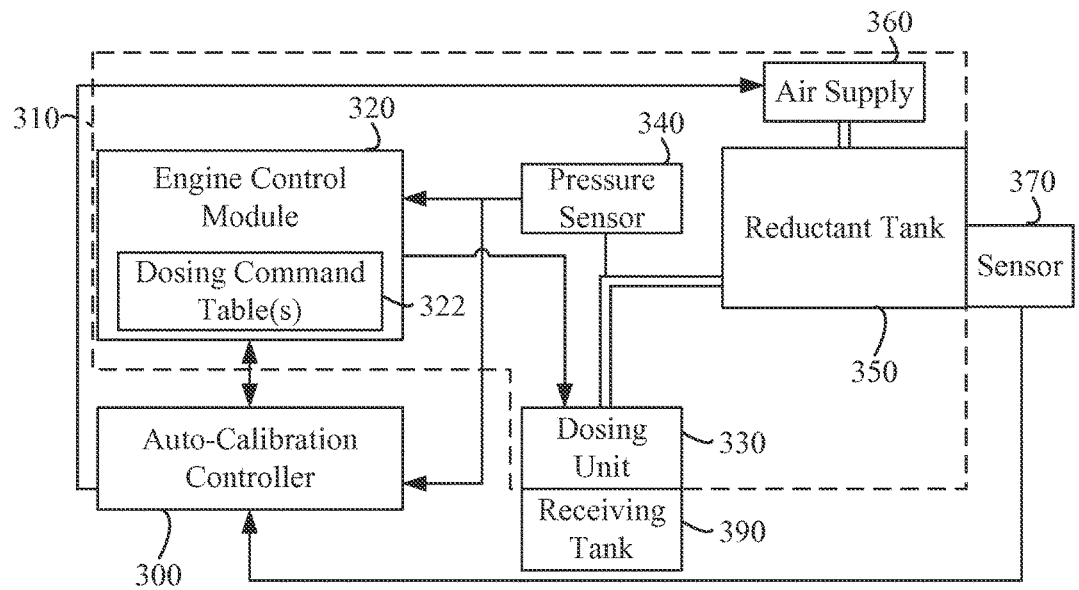
FIG. 3 is a block schematic diagram of an example system for automatically tuning dosing commands for a dosing unit.

FIG. 3 depicts an example portion 310 (outlined in phantom) of a final aftertreatment system coupled to an auto-calibration controller 300 to automatically tune the dosing unit 330 for use with the aftertreatment system 310. The auto-calibration controller 300 may include a calibration module and is in electrical communication with an engine control module 320 of the aftertreatment system. The engine control module 320 includes a dosing command table 322, which may be configured in a similar manner to the dosing command table 200 of FIG. 2. The dosing command table 322 can be populated with dosing command values based on a commanded amount of dosed reductant from dosing unit and/or a commanded dosing rate and a pressure input value for the pressure of reductant supplied to the dosing unit 330. The dosing command table 322 may initially be pre-populated with dosing command values by a manufacturer without regard to the final system into which the dosing unit will be integrated. The auto-calibration controller 300 can be configured to use the initial dosing command values of the dosing command table 322 to dose reductant via the dosing unit 330, determine an actual amount of dosed reductant, and modify the dosing command values based on an expected amount of dosed reductant and an actual amount of dosed reductant. In some implementations, the engine control module 320 may include a dosing control module and/or the dosing control module may be separate from the engine control module 320. In still further implementations, the auto-calibration controller 300 may be integrated into the engine control module 320 as an auto-calibration control module and selectively activated, such as when executing the processes 400, 500 of FIGS. 4-5.

The engine control module 320 is electrically coupled to the dosing unit 330 and is configured to control the operation of the dosing unit 330 and/or other components that affect the dosing of reductant from the dosing unit 330. The engine control module 320 may be configured to control the voltage output to the dosing unit 330 and/or other components to control the operation of the dosing unit 330 and/or the other components.

The dosing unit 330 is in fluid communication with a reductant tank 350 that stores reductant to be dosed via the dosing unit 330. In some implementations, the reductant tank 350 is in fluid communication with an outside pressure supply 360 to pressurize the reductant tank 350 and the reductant therein. The outside pressure supply 360 may be an adjustable air supply to selectively control the pressure of air supplied to the reductant tank 350. In other implementations, a pump may pressurize reductant from the reductant tank 350 for the dosing unit 330.

The engine control module 320 is also configured to interpret a parameter indicative of a value for the pressure measured by a pressure sensor 340 of an inlet to the dosing unit 330. In some implementations, the parameter indicative of the value for the pressure measured by the pressure sensor 340 may be directly received by the engine control module 320 or may be read from a data storage, such as a memory module.

During regular operation of the aftertreatment system 310, the engine control module 320 may determine, interpret, and/or receive a value for an amount of reductant to be dosed into exhaust gas flowing through an exhaust system of the aftertreatment system 310. For instance, in some implementations, the engine control module 320 may perform a feed-forward calculation for the amount of $NO_x$ that will be present in the exhaust gas of the exhaust system based on the operating conditions of an engine and the engine control module 320 then calculates the amount of reductant to be dosed to treat the $NO_x$ in the exhaust gas. In other instances, the engine control module 320 may interpret a parameter from a $NO_x$ sensor indicative of an amount of $NO_x$ in the exhaust gas and can then calculate the amount of reductant to be dosed to treat the $NO_x$ in the exhaust gas. In other implementations, the amount of reductant to be dosed may be calculated by a separate module and/or retrieved from a data storage, such as a memory, such as look-up tables. In some implementations, the amount of reductant to be dosed may include a dosing rate, such as mL/s of reductant, to be dosed by the dosing unit 330. The engine control module 320 interprets the parameter indicative of the value for the pressure measured by the pressure sensor 340 and, using the amount of reductant to be dosed and/or the reductant dosing rate, determines a dosing command value or values from the dosing command table 322 to output to the dosing unit 330 and/or other components to control the dosing of reductant. Thus, the engine control module 320 can control the dosing of reductant into the exhaust gas of an exhaust system of the aftertreatment system 310.

However, as noted above, pre-populated dosing command values of the dosing command table 322 from a manufacturer of the dosing unit 330 may be less effective based on modifications to the aftertreatment system 310 and/or components thereof. Thus, the auto-calibration controller 300 is configured to determine whether the actual amount of dosed reductant corresponds to the expected amount of dosed reductant. If the actual amount of dosed reductant is greater than or less than the expected amount of dosed reductant, the auto-calibration controller 300 is configured to modify the dosing command value or values of the dosing command table 322.

The auto-calibration controller 300 is configured to control the pressurization of the reductant tank 350 and/or the pressure of reductant from the reductant tank 350 to the dosing unit 330. In some implementations, the auto-calibration controller 300 may be electrically coupled to a valve from the outside pressure supply 360 to the reductant tank 350 to selectively open and/or close the valve to increase and/or decrease a pressure of the reductant tank 350, thereby increasing and/or decreasing the pressure measured by the pressure sensor 340. In other implementations, the auto-calibration controller 300 may be coupled to a pump, either a pressure supply pump and/or a reductant pump, to increase and/or decrease the pressure of reductant supplied to the dosing unit 330 and measured by the pressure sensor 340.

The auto-calibration controller 300 is also configured to interpret a parameter from a sensor 370 that is indicative of an actual amount of dosed reductant from the dosing unit 330. In some implementations, the sensor 370 may be a scale or other weight measuring sensor that measures the weight of the reductant tank 350, including the reductant therein. The sensor 370 may be calibrated to offset the weight of the empty reductant tank 350 such that the value output from the sensor 370 is the weight of the reductant within the reductant tank 350. In other implementations, the sensor 370 a scale or other weight measuring sensor that measures the weight of a receiving tank 390 into which the dosing unit 330 doses reductant. The sensor 370 may be calibrated to offset the weight of the empty receiving tank 390 such that the value output from the sensor 370 is the weight of the reductant within the receiving tank 390. In still other implementations, the sensor 370 may be a flow meter positioned between and in fluid communication with the reductant tank 350 and the dosing unit 330 such that the flow meter measures the rate of volumetric flow from the reductant tank 350 to the dosing unit 330. In still further implementations, the sensor 370 may be a volumetric measurement sensor, such as a float ball or other volumetric measurement device to measure the volume of reductant in the reductant tank 350 and/or receiving tank 390. Still other sensors 370 configured to measure an amount of dosed reductant from the dosing unit 330 may be used.

When the auto-calibration controller 300 is used for performance tuning of the engine control module 320 and dosing unit 330, the auto-calibration controller 300 may cause the engine control module 320 to use the first dosing command value from the dosing command table 322. The first dosing command value may correspond to a first expected amount of reductant to be dosed, such as for a first dosing rate command, at a first pressure value based on the dosing command table 322. The auto-calibration controller 300 controls the pressurization of the reductant tank 350 and/or the pressure of reductant from the reductant tank 350 to the dosing unit 330 to be at the first pressure value as measured by the pressure sensor 340. The engine control module 320 operates the dosing unit 330 and/or other components to dose reductant based on the dosing command value or values. In some implementations, the auto-calibration controller 300 may cause the engine control module 320 to dose reductant for a predetermined period of time (e.g., one second) or for a predetermined volume of reductant (e.g., 10 mL of dosed reductant). The sensor 370 measures the actual amount of dosed reductant from the dosing unit 330 and the auto-calibration controller 300 interprets the value of the parameter indicative of the measured actual amount of dosed reductant. The auto-calibration controller 300 compares the actual amount of dosed reductant from the dosing unit 330 to an expected amount of reductant to be dosed. If the actual amount of dosed reductant is greater than or less than the expected amount of dosed reductant, the auto-calibration controller 300 is configured to modify the dosing command value or values of the dosing command table 322. The operation of the auto-calibration controller 300 will be described in greater detail in reference to FIGS. 4-5.

In some implementations, a pump (not shown) may be in fluid communication with the receiving tank 390 and the reductant tank 350 to pump reductant from the receiving tank 390 to the reductant tank 350 during the performance tuning. In some implementations, a valve between the pump and the reductant tank 350 may be selectively opened and/or closed by the auto-calibration controller 300 to fluidly seal the pump from the reductant tank 350, such as when the reductant tank 350 is to be pressurized.

FIG. 4 depicts an example process 400 that may be implemented by the auto-calibration controller 300 of FIG. 3 to automatically tune the performance of the engine control module 320 and/or dosing unit 330. The process 400 includes initiating dosing unit calibration (block 410). The auto-calibration controller 300 is communicatively coupled to the engine control module 320 such that the auto-calibration controller 300 can control the engine control module 320 and modify the dosing command values of the dosing command table 322. In some implementations, the auto-calibration controller 300 can be communicatively coupled to the pressure sensor 340 and/or the sensor 370 to interpret parameters indicative of the pressure of the reductant being delivered to the dosing unit 330 and/or the actual amount of dosed reductant from the dosing unit 330. In other implementations, the auto-calibration controller 300 may be configured to access an interpret parameters indicative of the pressure of the reductant being delivered to the dosing unit 330 and/or the actual amount of dosed reductant from the dosing unit 330, such as from a memory or other storage device. The auto-calibration controller 300 can be further communicatively coupled to a component to control the pressurization of the reductant tank 350 and/or the pressure of reductant from the reductant tank 350 to the dosing unit 330, such as to a pressure supply pump, a valve regulating a pressure supply to the reductant tank 350, a pump between the reductant tank 350 and the dosing unit 330, etc.

The initiation of the dosing unit calibration (block 410) may include setting a flag in the engine control module 320 to indicate that the engine control module 320 is in a dosing unit calibration mode. The initiation of the dosing unit calibration may also include making the dosing command table or tables editable.

The process 400 also includes determining a dosing command value (block 420). The determination of the dosing command value is based on the dosing command table or tables. In some implementations, the determination of the dosing command value may start at an initial dosing command value of the dosing command table corresponding to a first dosing rate command and a first input pressure value (e.g., "D.C.11" of the dosing command table 200 of FIG. 2 that corresponds to the first dosing command rate "C1" and the first input pressure value "P1").

The process 400 also includes commanding a dosing unit to dose reductant based on the determined dosing command value (block 430). In some implementations, the auto-calibration controller 300 may cause the engine control module 320 to command the dosing unit 330 to dose reductant based on the dosing command value. That is, the auto-calibration controller 300 may override the engine control module 320 to cause the engine control module 320 to output the dosing command value or values (e.g., control voltages, etc.) to cause the dosing unit 330 to dose reductant at the corresponding expected dosing command rate and at the corresponding input pressure value. The auto-calibration controller 300 may control the input pressure value by controlling an outside pressure supply pump, a valve between the outside pressure supply and the reductant tank 350, and/or a pump between the reductant tank 350 and the dosing unit 330. Thus, the auto-calibration controller 300 can maintain the input pressure at a pressure corresponding to the input pressure value for the corresponding dosing command value. In some implementations, the auto-calibration controller 300 may cause the dosing unit 330 (either directly or via the engine control module 320) to dose reductant for a predetermined period of time, such as one second, or for a predetermined volume, such as 10 mL, based on the expected dosing rate from the dosing command table.

The process 400 further includes comparing an actual amount of dosed reductant to an expected amount of dosed reductant (block 440). The actual amount of dosed reductant can be determined by interpreting a parameter indicative of the actual amount of dosed reductant by the auto-calibration controller 300. For instance, the auto-calibration controller 300 interprets a parameter from a sensor 370 that is indicative of the actual amount of dosed reductant from the dosing unit 330. The sensor 370 may be a weight measuring sensor, such as a scale, that measures the weight of the reductant tank 350 and/or receiving tank 390. In some implementations, the sensor 370 may be a flow meter positioned between and in fluid communication with the reductant tank 350 and the dosing unit 330 such that the flow meter measures the rate of volumetric flow from the reductant tank 350 to the dosing unit 330. In still further implementations, the sensor 370 may be a volumetric measurement sensor, such as a float ball or other volumetric measurement device to measure the volume of reductant in the reductant tank 350 and/or receiving tank 390. Still other sensors 370 configured to measure an amount of dosed reductant from the dosing unit 330 may be used.

The expected amount of dosed reductant can be the expected amount of dosed reductant if a predetermined volume, such as 10 mL, is used. In other implementations, the expected amount of dosed reductant can be calculated based on the predetermined period of time, such as one second, and the dosing rate command of the dosing command table.

The auto-calibration controller 300 compares the actual amount of dosed reductant to the expected amount of dosed reductant. If the actual amount of dosed reductant is greater than or less than the expected amount of dosed reductant, then the process 400 proceeds to modify a parameter (block 450) to modify the dosing command value of the dosing command table. If the actual amount of dosed reductant is substantially the same as the expected amount of dosed reductant, then the process 400 returns to determining the next dosing command value (block 420), such as incrementing to the next dosing command value of the dosing command table. In some implementations, the dosing command value may be written to an updated dosing command table to preserve the original dosing command table. In some implementations, the comparison of the actual amount of dosed reductant to the expected amount of dosed reductant (block 440) may determine whether the absolute difference between the two values is below an acceptable error amount. Thus, even if there is some error between the expected amount of dosed reductant and the actual amount of dosed reductant, the process 400 does not loop through modifying parameters to obtain an exact match.

The modification of a parameter or parameters (block 450) may include modifying a dosing command value and/or a parameter affecting the dosing of reductant from the dosing unit 330. For instance, the modification of the parameter may correspond to modifying a parameter that controls the size of an opening through a dosing nozzle of the dosing unit 330, such as a parameter for a voltage that actuates an actuator of the dosing unit 330. In other implementations, the modification of the parameter may correspond to modifying a parameter that controls a valve component to modify an amount of reductant cycled through the dosing unit 330 back to the reductant tank 350. Still other parameters may be modified that affect the dosing of reductant from the dosing unit 330. In some implementations, the modification of the parameter may be based on a machine learning algorithm that updates the tuning in real-time based on empirical measurements. The updated dosing command value based on the modified parameter can overwrite the prior dosing command value of the dosing command table and/or may be saved to an updated dosing command table.

In some implementations, the process 400 may be applied for a static dosing command table and/or dynamic dosing command table. In some implementations, the process 400 may also determine if the reductant tank 350 is empty and/or the stored reductant is below a predetermined volume, such as comparing the aggregated amounts of dosed reductant to the starting volume and/or a predetermine volume of reductant in the reductant tank 350. If the stored reductant is below the predetermined volume and/or the reductant tank 350 is empty, the process 400 may pause the performance tuning and pump reductant from the receiving tank 390 to the reductant tank 350, thereby allowing the system to restore itself back into a correct test state. In other implementations, the process 400 may also pause the performance tuning when an amount of pressure from the outside pressure supply is below a predetermined level and/or the outside pressure supply source is empty.

FIG. 5 depicts an example process 500 for iterating through dosing command values to tune an engine control module and/or dosing unit. The process 500 may be implemented as part of the process 400 of FIG. 4 or be a separate process. The process 500 includes commanding a dosing unit to dose an amount of reductant based on a dosing command rate, $C_j$, and an input pressure value, $P_i$ (block 510). The dosing command value is based on a dosing command table or tables, such as dosing command table 200 of FIG. 2. The dosing command value may start at an initial dosing command value of the dosing command table corresponding to a first dosing rate command and a first input pressure value (e.g., "D.C.11" of the dosing command table 200 of FIG. 2 that corresponds to the first dosing command rate "C1" and the first input pressure value "P1"). The commanding of the dosing unit to dose an amount of reductant based on a dosing command rate and an input pressure value may be performed in a similar manner to the commanding a dosing unit to dose reductant based on the determined dosing command value (block 430) described in reference to FIG. 4.

The process 500 includes measuring the actual amount of dosed reductant (block 520). The actual amount of dosed reductant can be determined by interpreting a parameter indicative of the actual amount of dosed reductant by the auto-calibration controller. For instance, the auto-calibration controller can interpret a parameter from a sensor that is indicative of the actual amount of dosed reductant from the dosing unit. The sensor may be a weight measuring sensor, such as a scale, that measures the weight of the reductant tank and/or receiving tank. In some implementations, the sensor may be a flow meter positioned between and in fluid communication with the reductant tank and the dosing unit such that the flow meter measures the rate of volumetric flow from the reductant tank to the dosing unit. In still further implementations, the sensor may be a volumetric measurement sensor, such as a float ball or other volumetric measurement device to measure the volume of reductant in the reductant tank and/or receiving tank.

The process 500 includes determining if the actual amount of dosed reductant, $DosedAmount_{Actual}$, is equal or substantially equal to the expected amount of dosed reductant, $Dosed Amount_{Expected}$, (block 530). In some implementations, the comparison of the actual amount of dosed reductant to the expected amount of dosed reductant may determine whether the difference between the two values is below an acceptable error amount, such as ±5%, ±1%, ±0.1%, etc. Thus, even if there is some error between the expected amount of dosed reductant and the actual amount of dosed reductant, the process 500 does not loop through to obtain an exact match.

If the actual amount of dosed reductant is not equal, substantially equal, or below the acceptable error amount relative to the expected amount of dosed reductant, then the process 500 proceeds to modifying one or more parameters and updating a dosing command table (block 540). The modification of a parameter or parameters may include modifying a dosing command value and/or a parameter affecting the dosing of reductant from the dosing unit. For instance, the modification of the parameter may correspond to modifying a parameter that controls the size of an opening through a dosing nozzle of the dosing unit, such as a parameter for a voltage that actuates an actuator of the dosing unit. In other implementations, the modification of the parameter may correspond to modifying a parameter that controls a valve component to modify an amount of reductant cycled through the dosing unit back to the reductant tank. Still other parameters may be modified that affect the dosing of reductant from the dosing unit. In some implementations, the modification of the parameter may be based on a machine learning algorithm that updates the tuning in real-time based on empirical measurements. The updating of a dosing command table may include overwriting a prior value with the updated dosing command value based on the modified parameter(s) and/or the modified parameter(s). In other implementations, an updated dosing command table may be generated and the updated dosing command value based on the modified parameter(s) and/or the modified parameter(s) may be saved to the updated dosing command table.

If the actual amount of dosed reductant is equal, substantially equal, or below the acceptable error amount relative to the expected amount of dosed reductant (block 530), then the process 500 determines whether the dosing command rate, $C_j$, is the last dosing command rate, $C_n$, of the dosing command table (block 550) and/or another predetermined ending dosing command rate for the process 500. If the dosing command rate, $C_j$, is not the last dosing command rate, $C_n$, then the process 500 increments the index value (i.e., j=j+1) for the dosing command rate, $C_j$ (block 560) and returns to command the dosing unit to dose based on a dosing command value from the dosing command table based on the incremented dosing command rate (block 510).

In some implementations, the incrementing of the dosing command rate, $C_j$, (block 560) may be based on the comparison of the actual amount of dosed reductant to the expected amount of dosed reductant (block 530). For instance, if the actual amount of dosed reductant is equal or substantially equal to the expected amount of dosed reductant, e.g., within ±0.1%, then the dosing command rate, $C_j$, may be incremented by 5, 10, etc., thereby reducing the number of iterations if the actual amount of dosed reductant is equal or substantially equal to the expected amount of dosed reductant.

If the dosing command rate, $C_j$, is the last dosing command rate, $C_n$, of the dosing command table (block 550), then the process 500 proceed to determining if the input pressure value, $P_i$, is the last input pressure value, $P_m$, of the dosing command table (block 570) and/or another predetermined ending input pressure value for the process 500. If the input pressure value, $P_i$, is not the last input pressure value, $P_m$, then the process 500 increments the index value (i.e., i=i+1) for the input pressure value, $P_i$ (block 580) and returns to command the dosing unit to dose based on a dosing command value from the dosing command table based on the incremented input pressure value (block 510).

If the input pressure value, $P_i$, is the last input pressure value, $P_m$, of the dosing command table (block 570), then the process 500 may proceed to end (block 590).

In some implementations, the determination and incrementing of the dosing command rate and input pressure values (blocks 550, 560 and blocks 570, 580) may be interchanged.

In some implementations, the processes 400, 500 may be performed for tuning an aftertreatment system for a single input pressure value or dosing command rate for several substantially similar aftertreatment systems. That is, a first aftertreatment system may be tuned for a first input pressure value, $P_1$, or first dosing command rate, $C_1$, a second aftertreatment system may be tuned for a second input pressure value, $P_2$, or second dosing command rate, $C_2$, etc. The several updated dosing command tables may be combined to generate an aggregated updated dosing command table. Thus, parallel performance of the processes 400, 500 may expedite updating the dosing command tables for the substantially similar aftertreatment systems.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The term "coupled" and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are commanded to be protected. It should be understood that some features may not be necessary and implementations lacking the various features may be contemplated as within the scope of the application, the scope being defined by the claims that follow. When the language "at least a portion" and/or "a portion" is used the item can include a portion and/or the entire item unless specifically stated to the contrary.

What is claimed is:
1. A system comprising:
    an aftertreatment system including:

a dosing unit,
a reductant tank in fluid communication with the dosing unit, and
a control module operable to control dosing of reductant from the dosing unit based on a dosing command table;
a pressure sensor configured to detect an input pressure of reductant to the dosing unit from the reductant tank;
a second sensor configured to measure an actual amount of dosed reductant by the dosing unit; and
an auto-calibration controller configured to:
    interpret a first parameter indicative of the input pressure of reductant to the dosing unit as substantially equal to a first input pressure value,
    command the control module of the aftertreatment system to command the dosing unit to dose reductant at a first dosing command rate at the first input pressure value based on a dosing command value of the dosing command table,
    interpret a second parameter indicative of the actual amount of dosed reductant by the dosing unit,
    compare the interpreted second parameter indicative of the actual amount of dosed reductant to an expected amount of dosed reductant based on the first dosing command rate, and
    update the dosing command value of the dosing command table of the control module of the aftertreatment system responsive to the comparison of the interpreted second parameter indicative of the actual amount of dosed reductant to the expected amount of dosed reductant.

2. The system of claim 1, wherein the auto-calibration controller is further configured to:
    command the control module of the aftertreatment system to command the dosing unit to dose reductant at a second dosing command rate at the first input pressure value based on a second dosing command value of the dosing command table,
    interpret a third parameter indicative of a second actual amount of dosed reductant by the dosing unit,
    compare the interpreted second parameter indicative of the second actual amount of dosed reductant to a second expected amount of dosed reductant based on the second dosing command rate, and
    update the second dosing command value of the dosing command table of the control module of the aftertreatment system responsive to the comparison of the interpreted third parameter indicative of the second actual amount of dosed reductant to the second expected amount of dosed reductant.

3. The system of claim 1 further comprising:
an outside pressure supply in fluid communication with the reductant tank;
wherein the auto-calibration controller is configured to selectively control a pressure of air supplied to the reductant tank from the outside pressure supply to control the input pressure of reductant to the dosing unit.

4. The system of claim 1, wherein the auto-calibration controller is configured to update the dosing command value responsive to a difference between the interpreted second parameter indicative of the actual amount of dosed reductant relative and the expected amount of dosed reductant exceeding a predetermined error threshold.

5. The system of claim 1, wherein the auto-calibration controller is further configured to:
    command the control module of the aftertreatment system to command the dosing unit to dose reductant at the first dosing command rate at the first input pressure value based on the updated dosing command value.

6. The system of claim 1, wherein commanding the dosing unit to dose reductant at the first dosing command rate based on the dosing command value of the dosing command table comprises dosing reductant at the first dosing command rate based on the dosing command value for a predetermined period of time.

7. The system of claim 1, wherein commanding the dosing unit to dose reductant at the first dosing command rate based on the dosing command value of the dosing command table comprises dosing reductant at the first dosing command rate based on the dosing command value for a predetermined volume.

8. The system of claim 1, wherein the second sensor is a weight scale.

9. The system of claim 8, wherein the second sensor measures the actual amount of dosed reductant by the dosing unit based on a weight of the reductant tank.

10. The system of claim 8, wherein the second sensor measures the actual amount of dosed reductant by the dosing unit based on a weight of a receiving tank into which reductant from the dosing unit is dosed.

11. An auto-calibration controller for automatically tuning a dosing module of an aftertreatment system, the aftertreatment system including the dosing module, a reductant tank in fluid communication with the dosing unit, and a control module operable to control dosing of reductant from the dosing unit based on a dosing command table, the auto-calibration controller comprising:
a calibration module configured to:
    interpret a first parameter indicative of an input pressure of reductant to the dosing unit as substantially equal to an input pressure value of the dosing command table,
    command the dosing unit to dose reductant at a dosing command rate at the input pressure value based on a dosing command value of the dosing command table,
    interpret a second parameter indicative of an actual amount of dosed reductant by the dosing unit,
    compare the interpreted second parameter indicative of an actual amount of dosed reductant to an expected amount of dosed reductant based on the dosing command rate, and
    update the dosing command value of the dosing command table of the control module of the aftertreatment system responsive to the comparison of the interpreted second parameter indicative of the actual amount of dosed reductant to the expected amount of dosed reductant.

12. The auto-calibration controller of claim 11, wherein the calibration module is further configured to:
    command the dosing unit to dose reductant at the dosing command rate at the input pressure value based on the updated dosing command value.

13. The auto-calibration controller of claim 12, wherein actual amount of dosed reductant by the dosing unit is based on an output of a weight sensor measuring a weight of one of the reductant tank or a receiving tank into which reductant from the dosing unit is dosed.

14. The auto-calibration controller of claim 13, wherein the calibration module is further configured to:

selectively control a pressure of air supplied to the reductant tank from an outside pressure supply to control an input pressure of reductant to the dosing unit.

15. The auto-calibration controller of claim 14, wherein the calibration module is configured to update the dosing command value responsive to a difference between the interpreted second parameter indicative of the actual amount of dosed reductant relative and the expected amount of dosed reductant exceeding a predetermined error threshold.

16. The auto-calibration controller of claim 15, wherein commanding the dosing unit to dose reductant at the dosing command rate based on the dosing command value of the dosing command table comprises one of dosing reductant at the dosing command rate based on the dosing command value for a predetermined period of time or a predetermined volume.

17. A system comprising:
an aftertreatment system including:
a dosing unit,
a reductant tank in fluid communication with the dosing unit, and
a control module operable to control dosing of reductant from the dosing unit based on a dosing command table; and
an auto-calibration controller configured to:
interpret a first parameter indicative of an input pressure of reductant to the dosing unit as substantially equal to an input pressure value,
command the dosing unit to dose reductant at a dosing command rate at the input pressure value based on a dosing command value of the dosing command table,
interpret a second parameter indicative of an actual amount of dosed reductant by the dosing unit,
compare the interpreted second parameter indicative of the actual amount of dosed reductant to an expected amount of dosed reductant based on the dosing command rate, and
update the dosing command value of the dosing command table of the control module of the aftertreatment system responsive to the comparison of the interpreted second parameter indicative of the actual amount of dosed reductant to the expected amount of dosed reductant.

18. The system of claim 17, wherein the auto-calibration controller is further configured to:
command the dosing unit to dose reductant at the dosing command rate at the input pressure value based on the updated dosing command value.

19. The system of claim 17, wherein the auto-calibration controller is further configured to:
selectively control a pressure of air supplied to the reductant tank from an outside pressure supply to control the input pressure of reductant to the dosing unit.

20. The system of claim 17, wherein the actual amount of dosed reductant by the dosing unit is based on an output of a weight sensor measuring a weight of one of the reductant tank or a receiving tank into which reductant from the dosing unit is dosed.

21. An aftertreatment system comprising:
a dosing unit;
a reductant tank in fluid communication with the dosing unit; and
a control module operable to control dosing of reductant from the dosing unit based on a dosing command table and including an auto-calibration control module configured to:
interpret a first parameter indicative of an input pressure of reductant to the dosing unit as substantially equal to an input pressure value,
command the dosing unit to dose reductant at a dosing command rate at the input pressure value based on a dosing command value of the dosing command table,
interpret a second parameter indicative of an actual amount of dosed reductant by the dosing unit,
compare the interpreted second parameter indicative of the actual amount of dosed reductant to an expected amount of dosed reductant based on the dosing command rate, and
update the dosing command value of the dosing command table of the control module of the aftertreatment system responsive to the comparison of the interpreted second parameter indicative of the actual amount of dosed reductant to the expected amount of dosed reductant.

22. A method for automatic performance tuning of a dosing unit using an automatic calibration controller, the method comprising:
interpreting a first parameter indicative of an input pressure of reductant to a dosing unit from a pressure sensor as substantially equal to an input pressure value;
commanding the dosing unit to dose reductant at a dosing command rate at the input pressure value based on a dosing command value of a dosing command table stored in a computer readable storage medium of a control module operable to control dosing of reductant from the dosing unit based on the dosing command table;
interpreting a second parameter indicative of an actual amount of dosed reductant by the dosing unit from a second sensor;
comparing the interpreted second parameter indicative of the actual amount of dosed reductant to an expected amount of dosed reductant based on the dosing command rate; and
updating the dosing command value of the dosing command table of the control module of an aftertreatment system to an updated dosing command value responsive to the comparison of the interpreted second parameter indicative of the actual amount of dosed reductant to the expected amount of dosed reductant.

23. The method of claim 22 further comprising:
commanding the control module of the aftertreatment system to command the dosing unit to dose reductant at the updated dosing command rate at the first input pressure value.

24. The method of claim 22, wherein commanding the dosing unit to dose reductant at the dosing command rate based on the dosing command value of the dosing command table comprises dosing reductant at the dosing command rate based on the dosing command value for a predetermined period of time.

25. The method of claim 22, wherein commanding the dosing unit to dose reductant at the dosing command rate based on the dosing command value of the dosing command table comprises dosing reductant at the dosing command rate based on the dosing command value for a predetermined volume.

26. The method of claim 22 further comprising:
selectively adjusting a valve to increase or decrease a pressure of a reductant tank in fluid communication with the dosing unit.

* * * * *